United States Patent [19]

Fukuyama et al.

[11] 4,112,291
[45] Sep. 5, 1978

[54] POSITIONING SYSTEM IN A NUMERICALLY CONTROLLED APPARATUS

[75] Inventors: Hiroomi Fukuyama, Higashiyamato; Masahiro Kaku, Tachikawa, both of Japan

[73] Assignee: Fujitsu Fanuc Limited, Hino, Japan

[21] Appl. No.: 780,113

[22] Filed: Mar. 22, 1977

[30] Foreign Application Priority Data

Mar. 30, 1976 [JP] Japan .................................. 51-34860

[51] Int. Cl.² ............................................. G06M 3/14
[52] U.S. Cl. ......................... 235/92 MP; 235/92 EV; 235/92 R; 318/603
[58] Field of Search ........ 235/92 MP, 92 EV, 92 CC, 235/92 GC, 151.11; 318/603

[56] References Cited

U.S. PATENT DOCUMENTS

| 3,612,976 | 10/1971 | Tripp ............................. 235/92 MP |
| 3,626,266 | 12/1971 | Sindelar et al. .................. 318/603 X |
| 3,974,432 | 8/1976 | Thompson ....................... 318/603 X |

*Primary Examiner*—Joseph M. Thesz
*Attorney, Agent, or Firm*—Staas and Halsey

[57] ABSTRACT

A positioning system in a numerically controlled apparatus in which a position of a controlled object such as table and tool is controlled by command pulses delivered from the numerical control apparatus. The positioning system
 generates first pulses every time the controlled object moves a first predetermined amount;
 generates second pulses every time the controlled object moves a second predetermined amount larger than the first predetermined amount, and;
 detects the moving amount of the controlled object.
A counter which has a capacity equivalent to the number of the first pulses generated while the object moves the second predetermined amount and which is set with a position error of the controlled object corresponding to the difference between the number of command pulses and that of the first pulses when the second pulses are generated at least one time, and counts the command pulses after being set with the position error. The numerical control apparatus stops the command pulses when the content of the counter reaches a predetermined value. The apparatus also provides for returning the controlled object to an original position, and also for offsetting this position.

6 Claims, 9 Drawing Figures

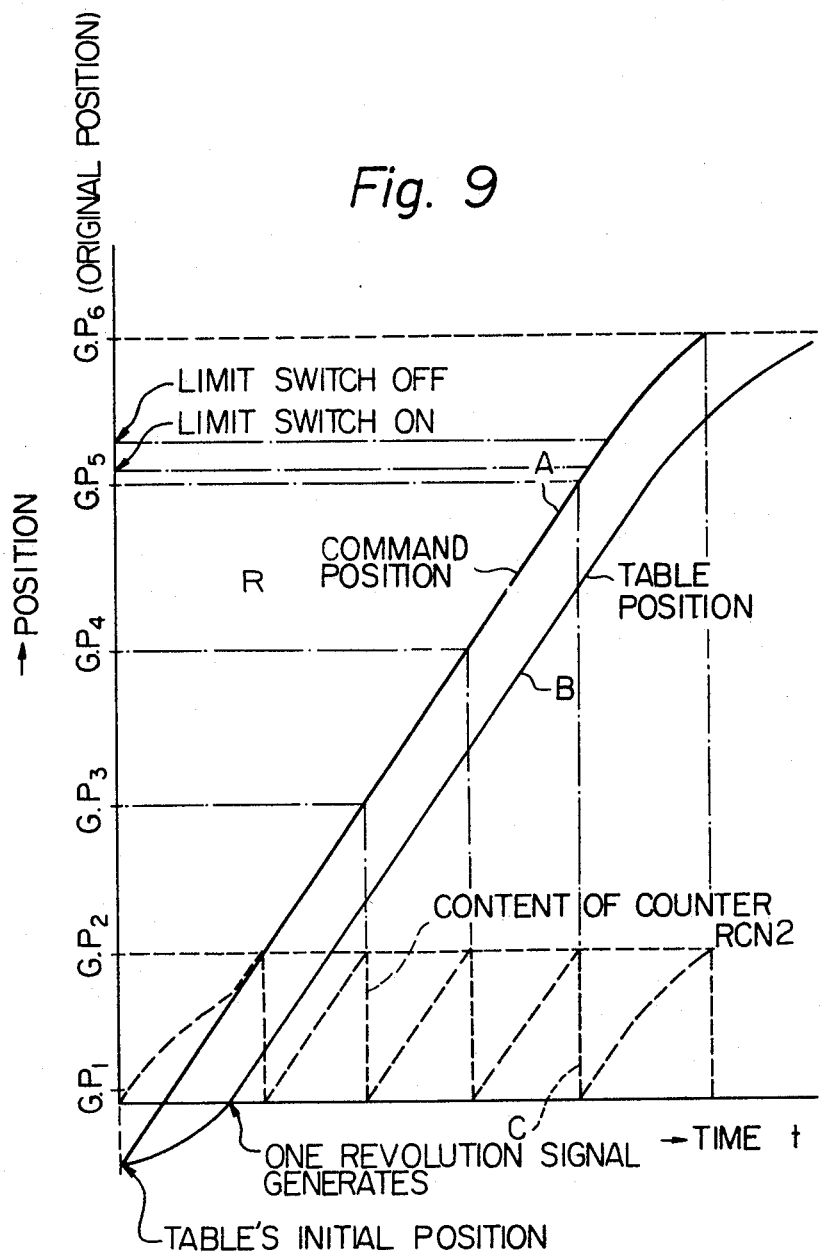

POSITIONING SYSTEM IN A NUMERICALLY CONTROLLED APPARATUS

BACKGROUND OF THE INVENTION

1. Field of the Invention

The present invention relates to a system for positioning a controlled object such as table or bite in a machine tool of a closed loop type numerically controlled apparatus. More particularly the present invention relates to a system for returning the controlled object to an original position.

2. Description of the Prior Art

In conventional machine tools which are numerically controlled, various position detectors such as resolver, Inductosyn (trademark) and rotary encoder are used for the purpose of detecting the position of the table. Herein, a rotary encoder, for example, can be inexpensively used in the numerically controlled machine tool. Therefore, the conventional machine which uses a rotary encoder becomes inexpensive and it can be used in a manner of digital control because the rotary encoder generates pulse outputs. However, in the conventional numerically controlled machine tool which uses a rotary encoder as the position detector, the time delay between command pulses and feedback pulses varies in accordance with the variation of the load, so that the table can not be precisely returned to the original position. Further, in such a conventional numerically controlled machine tool provided with a rotary encoder, a positioning by grid point control as applicable to a numerically controlled machine tool using a resolver or Inductosyn, or an electronical displacement of the grid points can not be expected.

SUMMARY OF THE INVENTION

An object of the present invention is to provide a system for precisely positioning at the original point, a controlled object such as table and tool in a numerically controlled machine tool if a rotary encoder is used as the position detector.

Another object of the present invention is to provide a system for positioning a table in a numerically controlled machine tool which can check whether or not the table is returned to the original position.

A further object of the present invention is to provide a system for positioning a table in a numerically controlled machine tool, and which can shift the original position thereof.

For achieving the above-mentioned objects, the present invention, which is directed to a positioning system in a numerically controlled apparatus in which the position of a table is controlled by command pulses delivered from the numerical control apparatus, comprises means for generating first pulses every time the table moves a first predetermined amount, for generating second pulses every time the table moves a second predetermined amount larger than the first predetermined amount and for detecting the moving amount of the table; counting means which has a capacity which is equivalent to the number of the first pulses generated while the table moves the second predetermined amount and which is set with a position error of the table corresponding to the difference between the number of command pulses and the number of the first pulses when at least one second pulse is generated, and counts the command pulses after being set with the position error, and; means for stopping the command pulses when the content of the counting means reaches a predetermined value.

Further features and advantages of the present invention will be apparent from the ensuing description with reference to the following described accompanying drawings to which, however, the scope of the present invention is no way limited.

BRIEF DESCRIPTION OF THE DRAWINGS

FIG. 9 is a diagram which shows how the content of the counter is changed in the positioning system according to the present invention.

DESCRIPTION OF THE PREFERRED EMBODIMENT(S)

Figure 1:
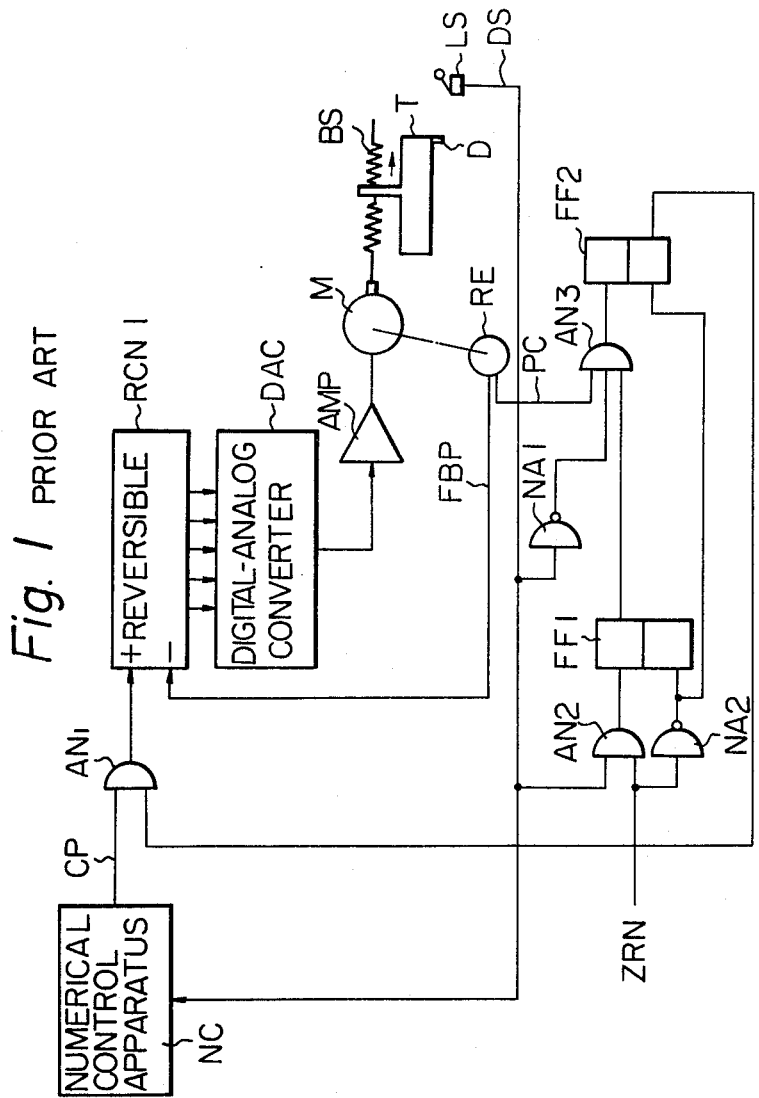
FIG. 1 is a block diagram of a conventional positioning system which uses a rotary encoder in a numerically controlled apparatus.

FIG. 1 shows a block diagram of a conventional numerically controlled system for positioning a table in a machine tool wherein a rotary encoder is used as the position detector. Referring to FIG. 1, when a command ZRN, which makes the table return to an original position, is "0," a reversible counter RCN1 counts command pulses CP which are sent out from a numerical control apparatus NC and a digital-analog converter DAC generates a voltage which is proportional to the counted content of the reversible counter RCN1. This voltage is amplified by an amplifier AMP so that a servo motor M is revolved and, by a ball screw BS which is coupled to the revolution axis of the servo motor M, a table T is moved. At the same time, the revolution of servo motor M makes a rotary encoder RE revolve. The rotary encoder RE generates pulse FBP every time the rotary encoder revolves a predetermined amount and generates a one revolution signal when the rotary encoder completes one revolution. The amount and number of the revolutions of the servo motor M which is detected by the rotary encoder RE is fed back to a subtraction terminal of the reversible counter RCN1 as the feed back pulses FBP so that the content of said reversible counter RCN1 is subtracted by the amount of said feed back pulses FBP. When the input of the command pulses CP is stopped and a number of feed back pulses FBP equal in number to the command pulses CP already connected are generated, the content of the reversible counter RCN1 becomes zero and the revolution of the servo motor stops. Thus, the positioning of the work piece is completed.

Next, when the command ZRN, which makes the table return to an original position, is "1," flip-flops FF1 and FF2 are initially "reset" and an AND gate AN1 is opened. Then, pulses from the numerical control apparatus NC, which return the table to the original position, are supplied to the reversible counter via the AND gate AN1 and the table T is displaced in the direction of the arrow to the original position in the above explained manner. When the table T approaches close to the original position, a dog D which is attached to the table pushes a limit switch LS for deceleration and a deceleration signal DS is generated by the limit switch. The deceleration signal DS opens an AND gate AN2 and sets the flip-flop FF1. At the same time, the deceleration signal DS is supplied to the numerical control apparatus NC so as to decrease the speed of the pulses for returning the table to the original position. Therefore, the table is displaced at low speed toward the original position. An AND gate AN3 is opened by a first one revolution signal which is generated in the rotary encoder RE after the limit switch LS is restored to the original state and, as a result, the flip-flop FF2 becomes "set." This causes the AND gate AN1 to close and the pulses for returning the table to the original position are no longer supplied to the reversible counter RCN1. After that the table T displaces the amount of the delay in the servo system which is stored in the reversible counter RCN1, which completes the displacement for returning the work piece to the original position.

In the above described system for returning the work piece to the original position, if the amount of the delay in the servo system is constant, the table is stopped at a definite position. However, in actual practice, the movement of the servo motor and, therefore, the amount of the delay in the servo system, varies in accordance with the variation of the load. Therefore, when the one revolution signal PC is generated at the rotary encoder RE, the content of the reversible counter RCN1 varies in accordance with the load condition. As a result, the position at which the table T should be stopped also varies in accordance with the load condition, so that precise control in returning the table to the original position can not be expected.

Figure 2:
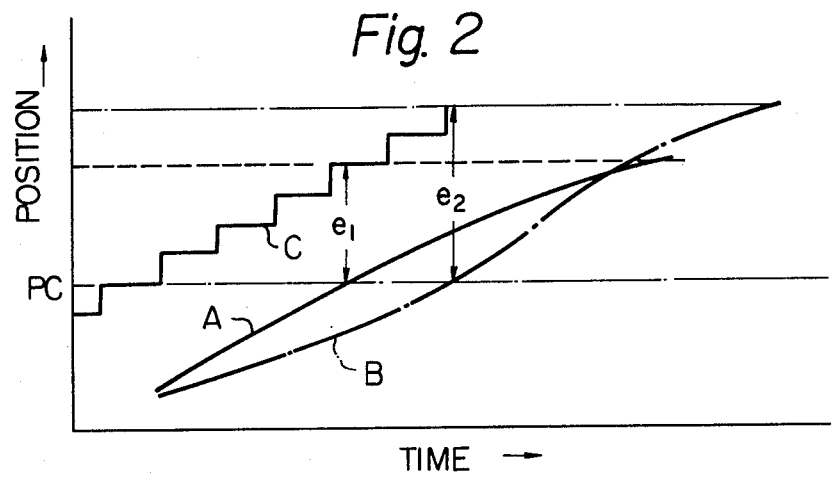
FIG. 2 is a diagram showing that an original position to which a table is to be returned is different in accordance with the loading condition.

FIG. 2 is a diagram which shows that the original positions to which the table are to be returned are different in accordance with the amount of the delay in the system, that is, the load condition. Referring to FIG. 2, curves A and B indicate the positions of the motor which is revolved under the different load conditions, and a staircase line C indicates the positions which are commanded. The curve A of FIG. 2 shows that the content of the reversible counter RCN1, shown in FIG. 1, is the amount "$e_1$" when the one revolution signal PC is generated in the rotary encoder RE, and the curve B of FIG. 2 shows that the content of the reversible counter RCN1 is the amount "$e_2$." Therefore, the curve A shows that the table T shown in FIG. 1 stops after moving the amount "$e_1$" after the one revolution signal is generated, and the curve B shows that the table stops after moving the amount "$e_2$" after the one revolution signal is generated. Therefore, the stop positions are different in accordance with the different load conditions.

For the purpose of solving the above-mentioned problem, the following three methods can be proposed.

(a) Decreasing the feeding speed of the table to the amount which causes no delay in the system;

(b) Presetting the content of the reversible counter at a constant value when the one revolution pulse is generated in the rotary encoder.

(c) Estimating the position at which the one revolution signal is generated, forming a signal which has a predetermined relation to the command signal and stopping the command pulse by this signal.

However, for the first method (a), the table should be fed with the feeding speed of $1/K\ H_z$ (K is the gain of the servo system), and therefore, a large amount of time is required for returning the table to the original position and checking of whether the table is returned to the original position. In the second method (b), the table stops at a position which is different from the position commanded by the command pulses and, therefore, the indicated value by an indicator does not coincide with the actual stop position. Further, no method of checking whether the table is returned to the original position exists. The present invention is related to a system which solves the conventional problem based on the above-mentioned third method (c).

Figure 3:
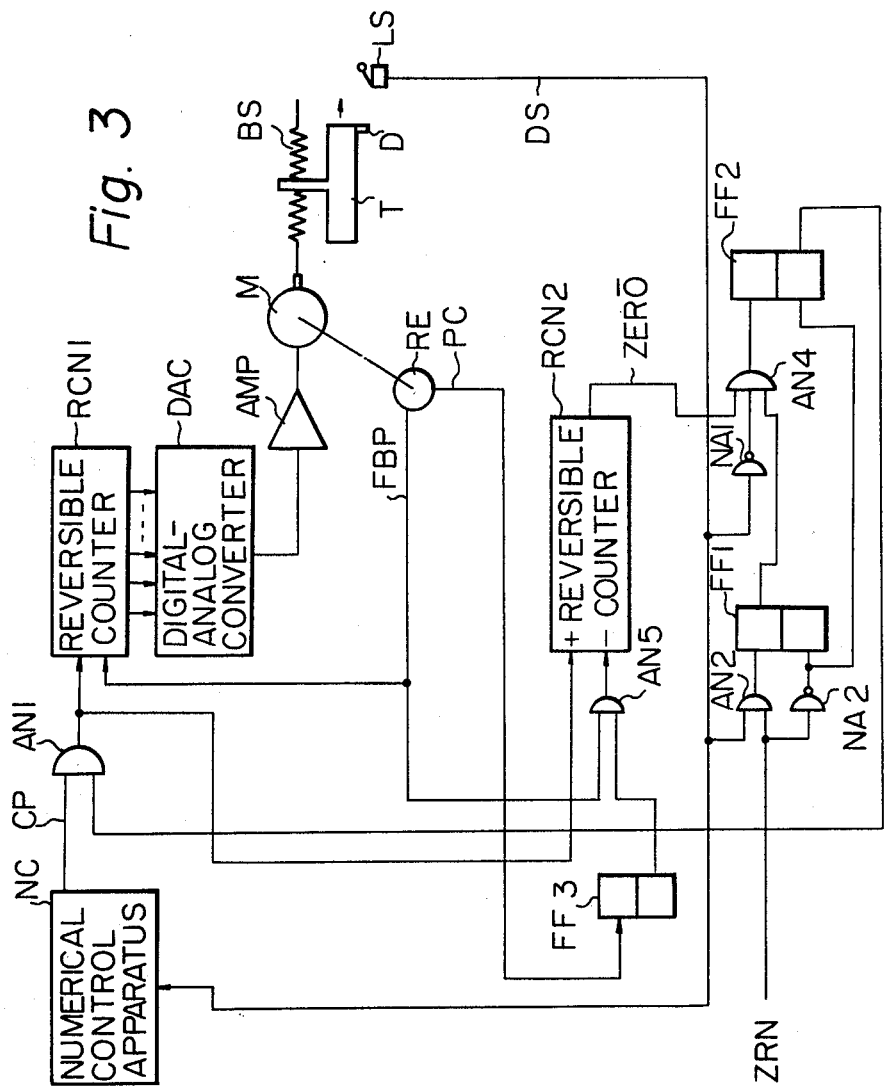
FIG. 3 is a block diagram of a positioning system in a numerically controlled apparatus according to the present invention.

FIG. 3 is a block diagram of the numerically controlled system for positioning a work piece in a machine tool according to the present invention. In FIG. 3, the same elements as indicated in FIG. 1 are denoted by the same symbols as used in FIG. 1. The difference in the system of FIG. 3 from that of FIG. 1 is as follows. In the system of FIG. 3, a flip-flop FF3 is reset at an initial state and is set by the first one revolution signal PC. A reversible counter RCN2 has a capacity equal to the number of pulses FBP which are generated in the rotary encoder RE during the time the rotary encoder RE makes one revolution. An AND gate AN5 supplies the feed back pulses FBP to a subtraction terminal of the reversible counter RCN2 until the first one revolution pulse is generated by the rotary encoder RE. An AND gate AN4, which is used instead of the AND gate AN3 shown in FIG. 1, sets the flip-flop FF2 when the content of the reversible counter RCN2 becomes zero.

Before explaining the operation of the system shown in FIG. 3, we will explain FIG. 4 through FIG. 7.

Figure 4:
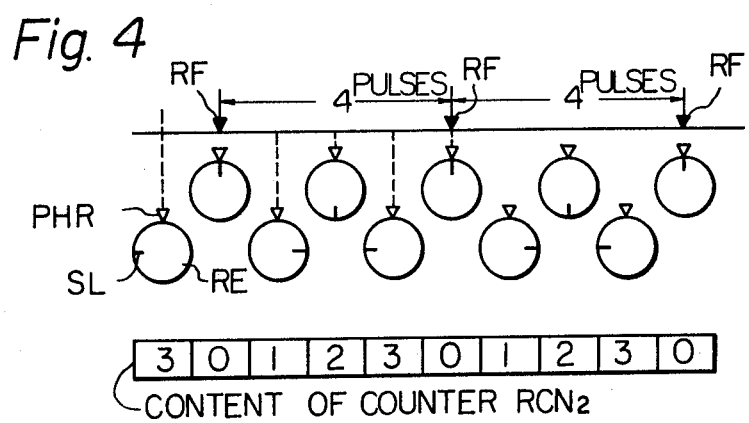
FIGS. 4 and 5 are diagrams which show a function of the reversible counter in FIG. 3.

FIG. 4 is a diagram which shows a relationship among reference positions RF which are mechanically determined, positions of a slit SL of the rotary encoder RE which generates the one revolution signal and the content of the reversible counter RCN2 shown in FIG. 3. For the purpose of convenience of explanation, we assume that, the rotary encoder RE makes one revolution every four pulses, that the capacity of the reversible counter RCN2 is the value "4" and that no delay exists between an axis of the motor and the movement of the table. In FIG. 4, symbol PHR indicates the portion which receives the one revolution pulse.

Figure 5:
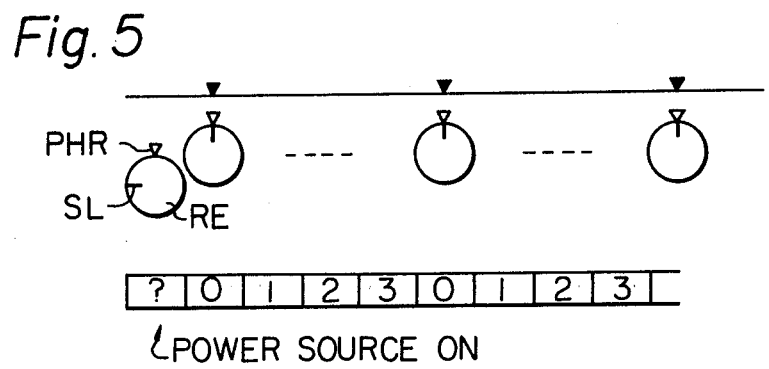

If the table stops at the reference RF which is called a grid point when the content of the reversible counter is zero and one revolution pulse PC is generated, the table will be displaced by the amount which is commanded by the command pulses and thereafter by feeding, the same number of the command pulses in the opposite direction the table will return to the original position. And at the time when the table completes returning to the original position the content of the reversible counter RN2 becomes zero and the one revolution pulse PC generates. That is, in the case where the relationship shown in FIG. 4 exists, the table stops at the grid point by stopping the command pulses when the content of the reversible counter is zero. However, when the power source is switched on, the table is usually not positioned at the grid point as shown in FIG. 5. Therefore, it is necessary to make the content of the reversible counter zero when the table is positioned at the grid point. However, in the system which uses a rotary encoder, the relationship between the position of the table and the reversible counter can not be found until the table is displaced to the grid point. Therefore, if no delay exists between the command pulses and the revolution of the motor, it is sufficient to make the content of the counter the value zero after displacing the table to the position of the grid point so as to generate one revolution signal. Thus, when this is done the table can be stopped at the grid point if the command pulses are stopped when the content of the counter becomes the value zero as shown in FIG. 5. However, usually a delay exists between the command pulses and the revolution of the motor and, for example, a DC motor or an electric oil pressure motor has a first order delay characteristic.

Therefore, when a delay exists between the command pulses and the revolution of the motor, although the table is moved to the grid point by the command pulses and thereafter the content of the counter is made the value zero, in the following positioning the table can not be stopped at the grid point by stopping the command pulses when the content of the counter becomes zero. Thus, the position at which the table stops varies in accordance with the amount of the delay between the command pulses and the rotation of the motor.

Figure 6:
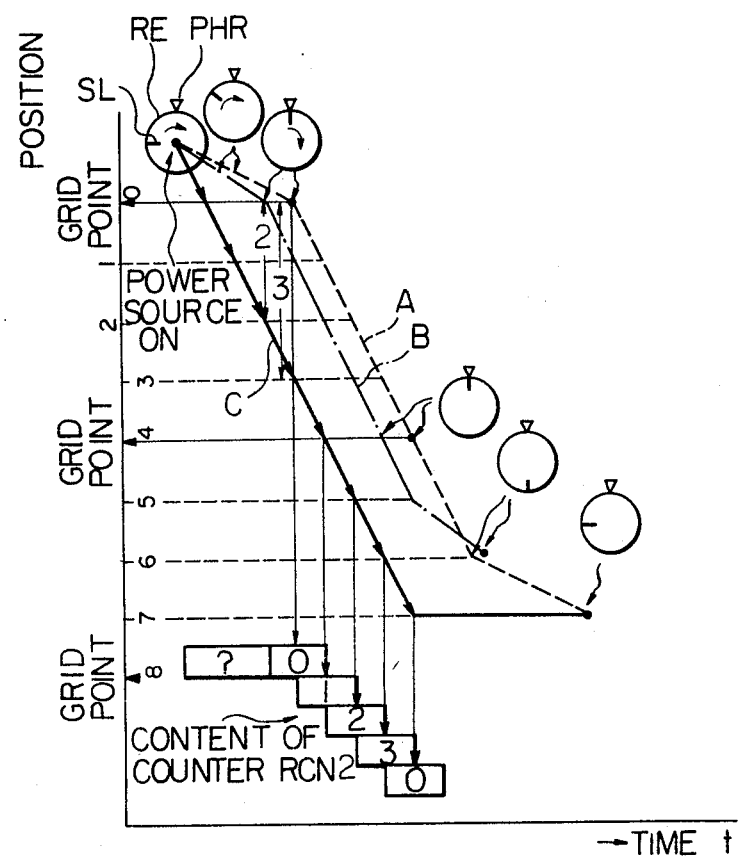
FIG. 6 is a diagram which shows that the position at which the table should be stopped varies in accordance with a position error of said table.

The diagram of FIG. 6 will be used to illustrate that the position at which the table stops varies according to the amount of the delay and that the table is not stopped at the grid point. Referring to FIG. 6, when the power source is switched on, the rotary encoder is positioned at a position of one pulse before the one revolution signal is generated and the content of the counter indicates an undetermined value. When the command pulses are supplied to the servo motor and said motor revolves, the rotary encorder generates one revolution pulse delayed three pulses from the command position C in a loaded condition A shown in FIG. 6. Here, if the reversible counter is reset to zero when the first one revolution signal is generated and thereafter the command pulse is stopped when the content of the reversible counter is zero, the table will stop at a position one pulse before the grid point. On the other hand, in a loaded condition B in FIG. 6, the table stops at a position two pulses before the grid point because the rotary encoder generates the one revolution signal delayed two pulses from command position.

For removing the above-mentioned drawback, according to the present invention, the position error is set in the reversible counter RCN2 when the table reaches a first grid point, in other words, when the rotary encoder generates the first one revolution signal PC. As a result, the table can be stopped at the grid point if the command pulses are stopped when the content of the counter is zero.

Figure 7:
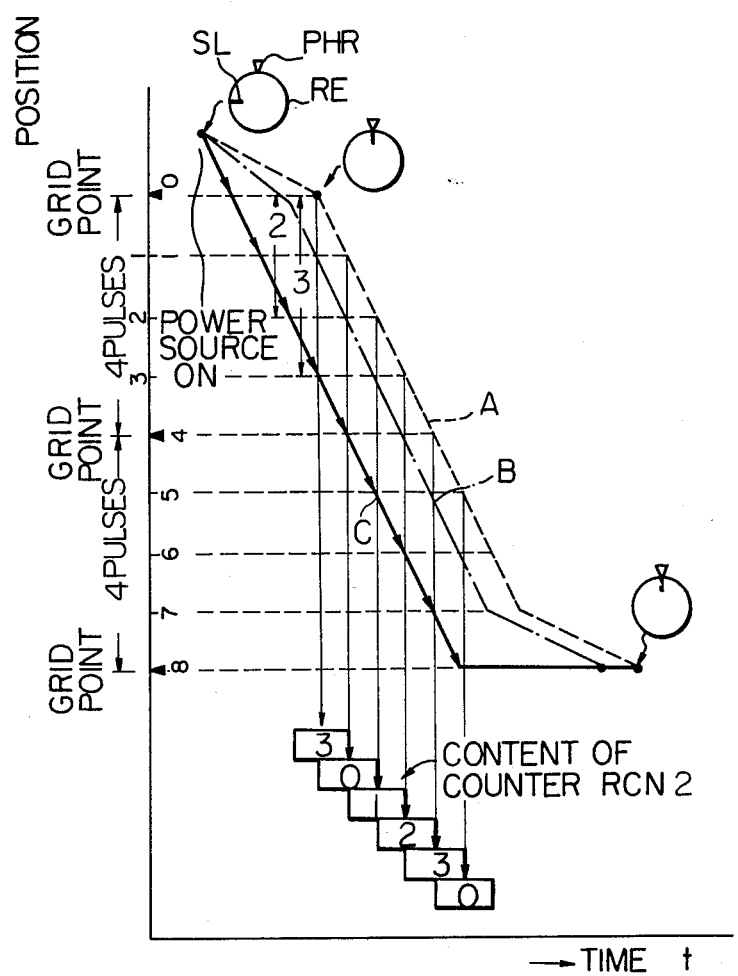
FIGS. 7 and 8 are diagrams which show that the position at which the table should be stopped does not vary in accordance with a position error of said table according to the present invention.

Referring to FIG. 7, if the command pulses are supplied to the motor so as to make it revolve and to drive the table in the loaded condition A, the delay amount is three pulses when the first one revolution pulse is generated, and this amount of three is preset in the reversible counter RCN2. Thereafter if the reversible counter RCN2 counts only the command pulses and the command pulses are stopped when the content of said counter is zero, the table will move by the amount of the delay after stopping the command pulses and occupy the position which is the correct grid point. In the loaded condition B in FIG. 7, the position error when the first one revolution signal is generated is an amount "2." Therefore, if this amount "2" is preset in the reversible counter by the one revolution signal, the motor stops at the correct grid point by stopping the comman pulses when the content of the reversible counter is zero. Therefore, in the present invention, if the command pulses are stopped when the content of the reversible counter is zero, the motor stops at the grid point regardless of the position error. Consequently, the table is correctly returned to the original point and the table's return to the original point can be checked by checking whether the content of the counter is zero and whether the one revolution signal is generated.

Figure 8:
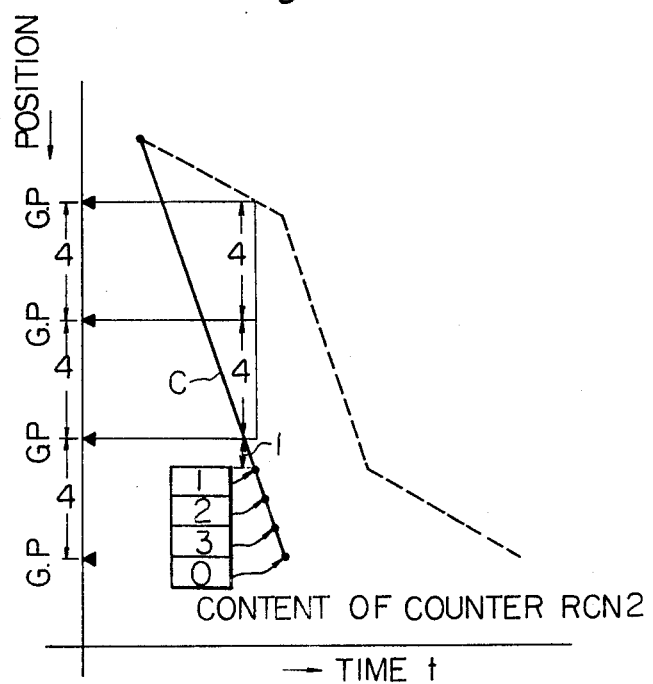

As above-mentioned, the capacity of the counter corresponds to the number of the feedback pulses generated during one revolution of the motor. Therefore, if the delayed amount exceeds this number, the content of the reversible counter exceeds the capacity of the counter for every one revolution, and this exceeded portion is transfered to the next grid point as shown in FIG. 8.

The function of the present invention will now be explained with reference to FIG. 3. Referring to FIG. 3, when the power source is switched on, the reversible counters RCN1, RCN2 and the flip-flops FF1, FF2, FF3 are all reset. When the command ZRN for returning the table to the original position is "0," the reversible counter RCN1 counts a command pulses CP every time one pulse is received. The digital analog converter DAC generates a voltage which is proportional to the content of the counter RCN1 and this voltage is supplied via the power amplifier AMP to the servo motor M so as to drive the table T. The amount of rotation of the servo motor M is detected by the rotary encoder RE and is supplied as the feed back pulse FBP to the subtration terminal of the reversible counter RCN1 so as to be subtracted from the content of said reversible counter. When the number of the command pulses CP and that of the feedback pulses FBP become equal, the content of the reversible counter becomes zero and the rotation of the servo motor stops, and thus, the positioning of the table is completed.

Herein the command pulses CP from the numerical control apparatus NC are supplied via the AND gate AN1 to the adding terminal of the reversible counter RCN2 so as to count the same. On the other hand, since the flip-flop FF3 is reset from the time the power source is switched on to the time the first one revolution signal is generated by the rotary encoder RE, the feed back pulses FBP from the rotary encoder RE are supplied via the AND gate AN5 to the subtraction terminal of the reversible counter RCN2 so as to subtract the same from the content of said reversible counter. Thus, when the first one revolution signal PC is generated, the content of the reversible counter RCN2 corresponds to a position error between the command pulses and the number of the feedback pulses or the displacement amount of the table, from the time the power source is switched on to the time the first one revolution pulse is generated.

As stated above, the capacity of the reversible counter RCN2 corresponds to the number of feedback pulses which are generated in the rotary encoder RE during one revolution of said rotary encoder RE. Therefore, if reversible counter RCN2 counts only the command pulses after the table arrives at the first grid point, when the content of said counter RCN2 becomes zero, the commanded position corresponds to the grid point.

When the command ZRN becomes "1," command pulses are supplied for returning the work piece to the original position from the numerical control apparatus NC via the gate AN1 to the reversible counters RCN1 and RCN2. This is because, the flip-flops FF1 and FF2 are reset and the AND gate AN1 is opened at that time. As a result the table is driven to the original position in the conventional manner in the direction of the arrow in FIG. 3. When the table approaches close to the original position and the dog D, which is attached to the table, pushes the limit switch LS for deceleration, the deceleration signal DS is generated. As a result the AND gate AN2 is opened and the flip-flop FF1 is set. At the same time, the deceleration signal is supplied to the numerical control apparatus NC so as to decrease the speed of the pulses for returning the work piece to the original position. Thus, the table is displaced to the original position at low speed. When the limit switch LS is restored to its original state and the content of the reversible counter RCN2 becomes zero, the output of the AND gate AN4 becomes "1," the flip-flop FF2 is set and the AND gate AN1 is closed. As a result, the pulses for returning the table to the original position are not supplied to the reversible counters RCN1 and RCN2.

According to the present invention, the command position coincides with the grid point and the table can stop at the grid point after displacing the difference between the number of command pulses and the number of feed back pulses which is stored in the reversible counter RCN2. Therefore, if the position of the grid point where the content of the counter becomes zero after the limit switch for deceleration is restored is used as the original point, the table stops correctly at the original point.

Referring to FIG. 9, a curve A shows a position which is commanded by the numerical control apparatus, a curve B shows a locus along which the table is displaced and a curve C shows how the content of the reversible counter RCN2 is changed in the present positioning system. As seen from FIG. 9, when the commanded position from the numerical control apparatus is the grid point (GP), the content of the reversible counter RCN2 is always zero.

In the above-mentioned explanation, the content of the reversible counter RCN2 is reset to zero when the power source is switched on. However, if the content of the reversible counter RCN2 is preset with an initial value N, the position to which the table is to be returned can be shifted the amount of N pulses. Further, if the flip-flop FF2 is set and the AND gate AN1 is closed when the content of the reversible counter RCN2 becomes a value M, which is not zero, the position to which the table is to be returned can be shifted the amount of M pulses.

As explained above, the table can be returned to the precise original position regardless of the position error of the table. In addition, when the initial value of the reversible counter RCN2 is set at zero, the position to be returned to coincides with the grid point. As a result, the return to the original position can be checked easily, because the one revolution pulse is generated.

In the explanation concerning FIG. 1 and FIG. 3, we assumed that the table moves in a direction shown in FIGS. 1 and 3, however, the present invention is not limited to movement of the table in that direction. If the table moves in the reverse direction to that in FIGS. 1 and 3, the table can be controlled by applying the command pulses to the subtraction terminal of the reversible counter and the feedback pulses to the adding terminal of said reversible counter.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A positioning system in a numerically controlled apparatus in which positioning of a controlled object is performed by command pulses delivered from a numerical control apparatus, said positioning system comprising:
   detecting means for generating first pulses each of which is indicative of a first predetermined amount of displacement of said object, for generating second pulses each of which is indicative of a second predetermined amount of displacement of said object larger than said first predetermined amount, and;
   counting means which has a capacity which is equivalent to the number of the first pulses generated while the object moves said second predetermined amount, said counting means being adapted to count up said command pulses and said counting means being adapted to count down said first pulses until the first one of said second pulses are generated;
   means for stopping said command pulses when the content of said counting means reaches a predetermined value.

2. A positioning system in a numerically controlled apparatus as claimed in claim 1 wherein said predetermined value is zero.

3. A positioning system in a numerical controlled apparatus according to claim 1, wherein a reversible counter is used as said counting means, and said reversible counter is set with the number of pulses corresponding to said position error by reversibly counting said command pulses and said first pulses until said second pulses are generated.

4. A positioning system in a numerical controlled apparatus according to claim 3, wherein said positioning system is used for returning the controlled object to an original position.

5. A positioning system in a numerically controlled apparatus according to claim 1, wherein the positioning point of the controlled object is shifted by changing an initial value of said reversible counter.

6. A positioning system in a numerically controlled apparatus according to claim 1, wherein said means for stopping said command pulses comprises gate means, said positioning system comprises limit switch means which is actuated when a controlled object arrives near the original position, and said gate means stops said command pulses when the content of said counting means arrives at a predetermined value after actuating said limit switch means.

* * * * *

UNITED STATES PATENT AND TRADEMARK OFFICE
CERTIFICATE OF CORRECTION

PATENT NO. : 4,112,291
DATED : September 5, 1978
INVENTOR(S) : Fukuyama et al.

It is certified that error appears in the above-identified patent and that said Letters Patent are hereby corrected as shown below:

Col. 5, line 34, "encorder" should be --encoder--;

Col. 5, line 36, "here" should be --Herein--;

Col. 6, line 1, "comman" should be --command--;

Col. 6, line 25, "CP" should be --PC--;

Col. 6, line 33, "subtration" should be --subtraction--.

Signed and Sealed this

Tenth Day of April 1979

[SEAL]

Attest:

RUTH C. MASON
Attesting Officer

DONALD W. BANNER
Commissioner of Patents and Trademarks